United States Patent
Sasaki

(10) Patent No.: US 10,403,864 B2
(45) Date of Patent: Sep. 3, 2019

(54) BATTERY

(71) Applicant: Panasonic Intellectual Property Management Co., Ltd., Osaka (JP)

(72) Inventor: Izuru Sasaki, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 122 days.

(21) Appl. No.: 15/490,829

(22) Filed: Apr. 18, 2017

(65) Prior Publication Data

US 2017/0331080 A1 Nov. 16, 2017

(30) Foreign Application Priority Data

May 16, 2016 (JP) .................................. 2016-097558

(51) Int. Cl.
| | |
|---|---|
| *H01M 2/02* | (2006.01) |
| *H01M 2/08* | (2006.01) |
| *H01M 2/16* | (2006.01) |
| *H01M 10/0562* | (2010.01) |
| *H01M 10/52* | (2006.01) |

(Continued)

(52) U.S. Cl.
CPC ......... *H01M 2/0285* (2013.01); *H01M 2/026* (2013.01); *H01M 2/08* (2013.01); *H01M 2/1094* (2013.01); *H01M 2/16* (2013.01); *H01M 4/131* (2013.01); *H01M 10/052* (2013.01); *H01M 10/0525* (2013.01); *H01M 10/0562* (2013.01); *H01M 10/52* (2013.01); *H01M 2200/00* (2013.01); *H01M 2220/30* (2013.01); *H01M 2300/0068* (2013.01)

(58) Field of Classification Search
CPC ........... H01M 10/052; H01M 10/0525; H01M 10/0562; H01M 10/52; H01M 2200/00; H01M 2200/30; H01M 2300/0068; H01M 2/026; H01M 2/0285; H01M 2/08; H01M 2/1094; H01M 2/16; H01M 4/131
See application file for complete search history.

(56) References Cited

U.S. PATENT DOCUMENTS 4,683,647 A * 8/1987 Brecht .................... H01M 2/06
                                                          29/623.2
5,500,308 A * 3/1996 West ....................... H01M 2/08
                                                          29/623.2

(Continued)

FOREIGN PATENT DOCUMENTS

JP 2009-193729 8/2009

OTHER PUBLICATIONS

Machine translation of Japanese Patent Publication JP 2009/193729. (Year: 2009).*

*Primary Examiner* — Sarah A. Slifka
*Assistant Examiner* — Lilia Nedialkova
(74) *Attorney, Agent, or Firm* — McDermott Will & Emery LLP

(57) ABSTRACT

A battery including a power generating element, a first sealant, a first holding member holding the first sealant, and an outer case enclosing the power generating element, wherein the first sealant and the first holding member are enclosed in the outer case together with the power generating element, and the first holding member holds the first sealant by enclosing the first sealant in a state in which the first sealant is not in contact with the power generating element.

23 Claims, 7 Drawing Sheets

(51) Int. Cl.
*H01M 4/131* (2010.01)
*H01M 10/052* (2010.01)
*H01M 10/0525* (2010.01)
*H01M 2/10* (2006.01)

(56) References Cited

U.S. PATENT DOCUMENTS

| | | | | |
|---|---|---|---|---|
| 5,607,787 | A * | 3/1997 | Wedlake | H01M 2/1094 |
| | | | | 429/120 |
| 5,709,966 | A * | 1/1998 | Sawada | H01M 2/24 |
| | | | | 429/152 |
| 2014/0079984 | A1 * | 3/2014 | Kajitani | H01M 2/08 |
| | | | | 429/162 |
| 2016/0155986 | A1 * | 6/2016 | Ito | H01L 51/5253 |
| | | | | 257/734 |

* cited by examiner

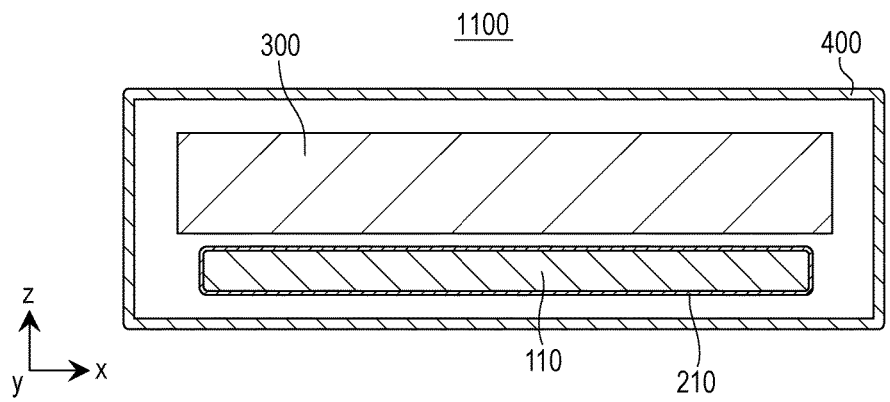
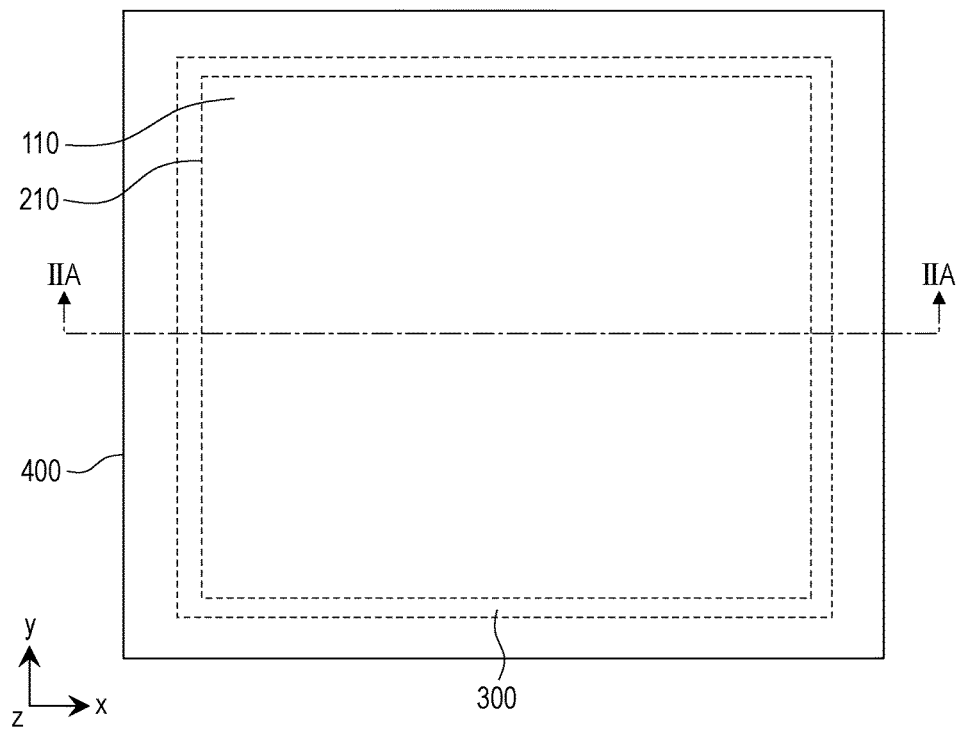

BATTERY

BACKGROUND

1. Technical Field

The present disclosure relates to a battery.

2. Description of the Related Art

Japanese Unexamined Patent Application Publication No. 2009-193729 discloses a solid-state battery which includes, in a closed battery case, a power generating element by the use of a sulfide-based solid electrolyte and which includes, in the closed battery case, a fluid sealant having no reactivity with the sulfide-based solid electrolyte and having a property of solidifying when the closed battery case is damaged.

SUMMARY

In the related art, a battery having high reliability has been desired.

In one general aspect, the techniques disclosed here feature a battery including a power generating element, a first sealant, a first holding member holding the first sealant, and an outer case enclosing the power generating element, wherein the first sealant and the first holding member are enclosed in the outer case together with the power generating element, and the first holding member holds the first sealant by enclosing the first sealant in a state in which the first sealant is not in contact with the power generating element.

According to the present disclosure, a battery having high reliability can be realized.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIGS. 2A and 2B are diagrams schematically showing the configuration of a battery according to the first embodiment;

DETAILED DESCRIPTION

The embodiments will be described below with reference to the drawings.

The present inventors paid attention to the points described below.

A power generating element, in which a sulfide solid electrolyte is used, generates hydrogen sulfide as a result of coming into contact with moisture. In order to avoid contact with moisture in the air, the power generating element including the sulfide solid electrolyte is enclosed in an outer case. However, in the case where the outer case is damaged by an external impact or the like, there is a problem that moisture gets inside the outer case through a damaged portion and hydrogen sulfide is generated.

Regarding such a problem, Japanese Unexamined Patent Application Publication No. 2009-193729 discloses a solid-state battery including, in a closed case, a power generating element in which a sulfide solid electrolyte is used, and including, in a closed case, a fluid sealant having a property of solidifying when the closed case is damaged.

However, the configuration disclosed in Japanese Unexamined Patent Application Publication No. 2009-193729 has a problem that the internal resistance of the power generating element increases due to direct contact between the power generating element and the fluid sealant.

Factors of an increase in the internal resistance include electrolysis of the fluid sealant and entry of the fluid sealant into the power generating element.

Regarding the electrolysis of the fluid sealant, an insulating material having very large electrical resistance is used for the fluid sealant. However, in particular, in the case where the power generating element is composed of a plurality of power generating base elements stacked in series, the fluid sealant is exposed to a very high voltage. Consequently, there is a concern that dielectric breakdown of the fluid sealant may occur and cause an increase in the internal resistance.

Regarding entry of the fluid sealant into the power generating element, an active material contained in the power generating element expands or shrinks at the time of charging or discharging. Consequently, the fluid sealant may be taken into gaps thereby formed inside the battery. The fluid sealant is an insulating material and, therefore, the internal resistance of the power generating element may increase.

The present disclosure was made in consideration of the above-described problems, an increase in the internal resistance of the power generating base element due to direct contact between the power generating element and the fluid sealant is suppressed, and high reliability can be realized.

First Embodiment

Figure 1A:
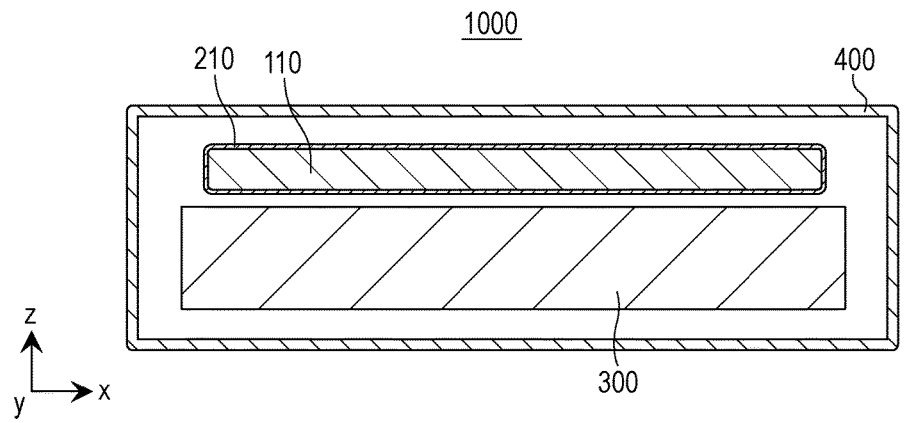
FIGS. 1A and 1B are diagrams schematically showing the configuration of a battery according to a first embodiment.
Figure 1B:
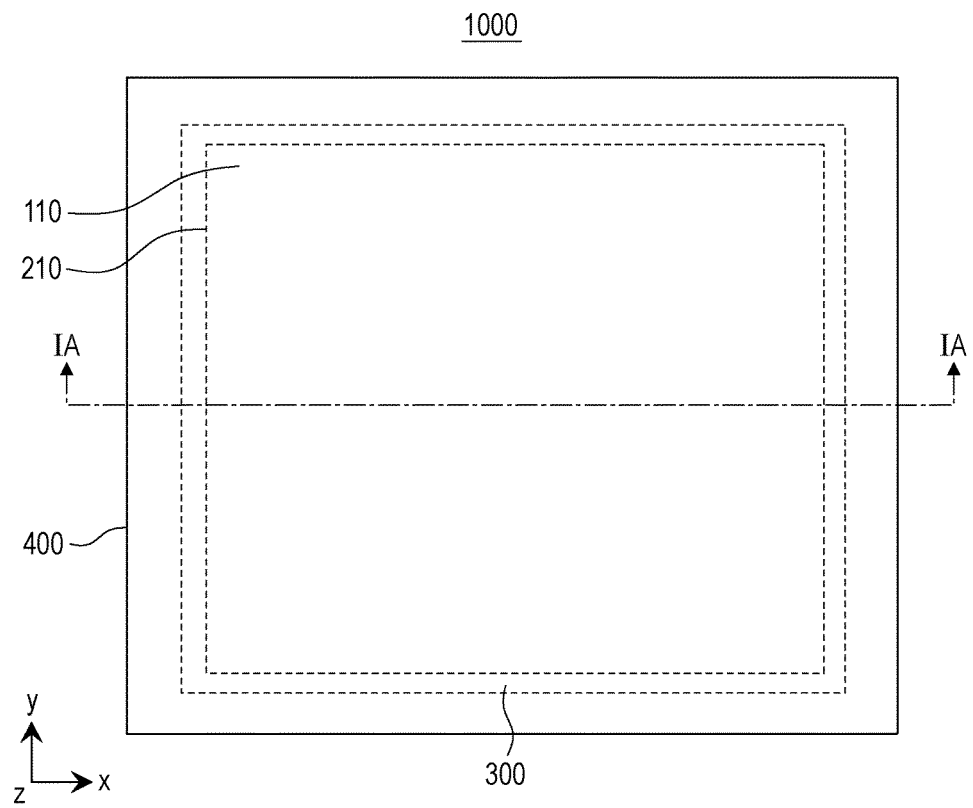

FIGS. 1A and 1B are diagrams schematically showing the configuration of a battery 1000 according to a first embodiment.

FIG. 1A is an x-z diagram (sectional view along line IA-IA) schematically showing the configuration of the battery 1000 according to the first embodiment.

FIG. 1B is an x-y diagram (perspective top view) schematically showing the configuration of the battery 1000 according to the first embodiment.

The battery 1000 in the first embodiment includes a first sealant 110, a first holding member 210, a power generating element 300, and an outer case 400.

The first holding member 210 holds the first sealant 110.

The outer case 400 encloses the power generating element 300.

The first sealant 110 and the first holding member 210 are enclosed in the outer case 400 together with the power generating element 300.

The first holding member 210 holds the first sealant 110 by enclosing the first sealant 110 while (i.e., in a state in which) the first sealant 110 is not in contact with the power generating element 300.

According to the above-described configuration, a battery having high reliability can be realized. That is, in the case where the outer case 400 is damaged by an external impact or the like and, in addition, the first holding member 210 is damaged (for example, crack, split, or the like), the first sealant 110 can be released from damaged portions of the first holding member 210. Consequently, the power generating element 300 can be covered with the first sealant 110 released and contact between the power generating element 300 and moisture can be prevented. Therefore, generation of hydrogen sulfide from the power generating element 300 can be suppressed.

According to the above-described configuration, in the case where the battery is free from irregularities (for example, in the case where the outer case 400 is not damaged and there is no probability of generation of hydrogen sulfide), the first holding member 210 can maintain the state in which the first sealant 110 and the power generating element 300 are isolated from each other. Consequently, in the case where the battery is free from irregularities, direct contact between the power generating element 300 and the first sealant 110 can be prevented. As a result, an increase in the internal resistance of the power generating element 300 can be suppressed.

For example, a metal, a resin, or the like is used as the material for forming the first holding member 210.

For example, the first holding member 210 may be formed (for example, in the shape of a thin film) so as to break at the instant when the outer case 400 is damaged by an external impact or the like.

In the first embodiment, the power generating element 300 may contain a sulfur-based material.

In this regard, the first holding member 210 may be corroded by hydrogen sulfide generated as a result of the sulfur-based material contained in the power generating element 300 (for example, as a result of a reaction between the sulfur-based material contained in the power generating element 300 and moisture which gets inside the outer case 400 when the outer case 400 is damaged).

That is, a material (for example, a metal) that forms corrosion holes as a result of the reaction with hydrogen sulfide may be used as the material for forming the first holding member 210.

According to the above-described configuration, the first sealant 110 can be released from corrosion holes formed by hydrogen sulfide. Consequently, for example, even in the case where the first holding member 210 is not sufficiently broken at the instant when the outer case 400 is damaged, the first sealant 110 can be released from corrosion holes of the first holding member 210 in accordance with generation of hydrogen sulfide. As a result, the power generating element 300 can be covered with the first sealant 110 released and, thereby, further contact between the power generating element 300 and moisture can be prevented. Therefore, further generation of hydrogen sulfide can be more reliably suppressed.

A metal (for example, copper or silver) that forms corrosion holes as a result of the reaction with hydrogen sulfide may be used as the material for forming the first holding member 210.

In the first embodiment, the first holding member 210 may contain copper.

According to the above-described configuration, the property of being corroded by hydrogen sulfide of the first holding member 210 can be further enhanced while the production cost is reduced.

The first holding member 210 may be fixed to the outer case 400.

Alternatively, the first holding member 210 may be fixed to the power generating element 300.

A material having electrical conductivity may be used for forming the first holding member 210. At this time, the battery 1000 according to the first embodiment may further include a partition wall (for example, a partition wall having an electron insulating property) or a gap between the first holding member 210 and the power generating element 300. Consequently, direct contact between the first holding member 210 and the power generating element 300 can be prevented.

In the first embodiment, the first holding member 210 may be arranged between a principal surface (for example, an upper surface or lower surface) of the power generating element 300 and the outer case 400.

According to the above-described configuration, for example, in the case where the battery is arranged at a position at which the battery easily receives an impact from the direction perpendicular to the principal surface of the power generating element 300, the first holding member 210 can be more easily damaged at the instant when the outer case 400 is damaged as a result of an impact on the battery. Consequently, the first sealant 110 can be more reliably released. As a result, the power generating element 300 can be covered with the first sealant 110 released and, thereby, further contact between the power generating element 300 and moisture can be prevented. Therefore, further generation of hydrogen sulfide can be more reliably suppressed.

FIGS. 2A and 2B are diagrams schematically showing the configuration of a battery 1100 according to the first embodiment.

FIG. 2A is an x-z diagram (sectional view along line IIA-IIA) schematically showing the configuration of the battery 1100 according to the first embodiment.

FIG. 2B is an x-y diagram (perspective top view) schematically showing the configuration of the battery 1100 according to the first embodiment.

In the first embodiment, the first holding member 210 may be arranged between the lower surface of the power generating element 300 and the outer case 400, as in the battery 1100 shown in FIGS. 2A and 2B.

Alternatively, in the first embodiment, the first holding member 210 may be arranged between the upper surface of the power generating element 300 and the outer case 400, as in the battery 1000 shown in FIGS. 1A and 1B.

The area of the principal surface of the power generating element 300 may be 1 to 100 $cm^2$ in the case of batteries for portable electronic equipment, e.g., a smart phone and a digital camera. Alternatively, the area of the principal surface of the power generating element 300 may be 100 to 1,000 $cm^2$ in the case of batteries for power supplies of large mobile equipment, e.g., an electric car.

The first holding member 210 may have a size that covers the entire principal surface of the power generating element 300 or a size that covers only part of the principal surface of the power generating element 300. As the area occupied by the first holding member 210 increases, the first sealant 110 can more reliably cover the power generating element 300 in the case where the first holding member 210 is damaged. Consequently, the reliability of the battery can be further enhanced. On the other hand, as the area occupied by the first holding member 210 increases, the energy density of the battery decreases. The area and the thickness of the first holding member 210 are appropriately designed in consideration of the reliability and the energy density of the battery.

The first sealant 110 released from the first holding member 210 may cover the entire power generating element 300. Consequently, contact between the entire power generating element 300 and moisture can be prevented. Therefore, generation of hydrogen sulfide from the power generating element 300 can be further suppressed.

Alternatively, the first sealant 110 released from the first holding member 210 may cover part (a portion which may generate hydrogen sulfide as a result of contact with moisture) of the power generating element 300. Consequently, contact between the part of the power generating element 300 and moisture can be prevented by a small amount of first sealant 110 held in the small first holding member 210. Therefore, generation of hydrogen sulfide from the part of the power generating element 300 can be suppressed without decreasing the energy density of the battery to a great extent.

Figure 3A:
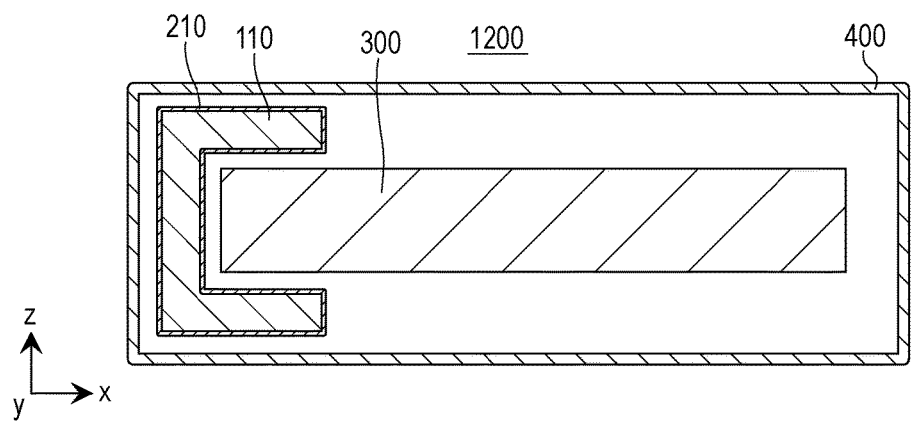
FIGS. 3A and 3B are diagrams schematically showing the configuration of a battery according to the first embodiment.
Figure 3B:
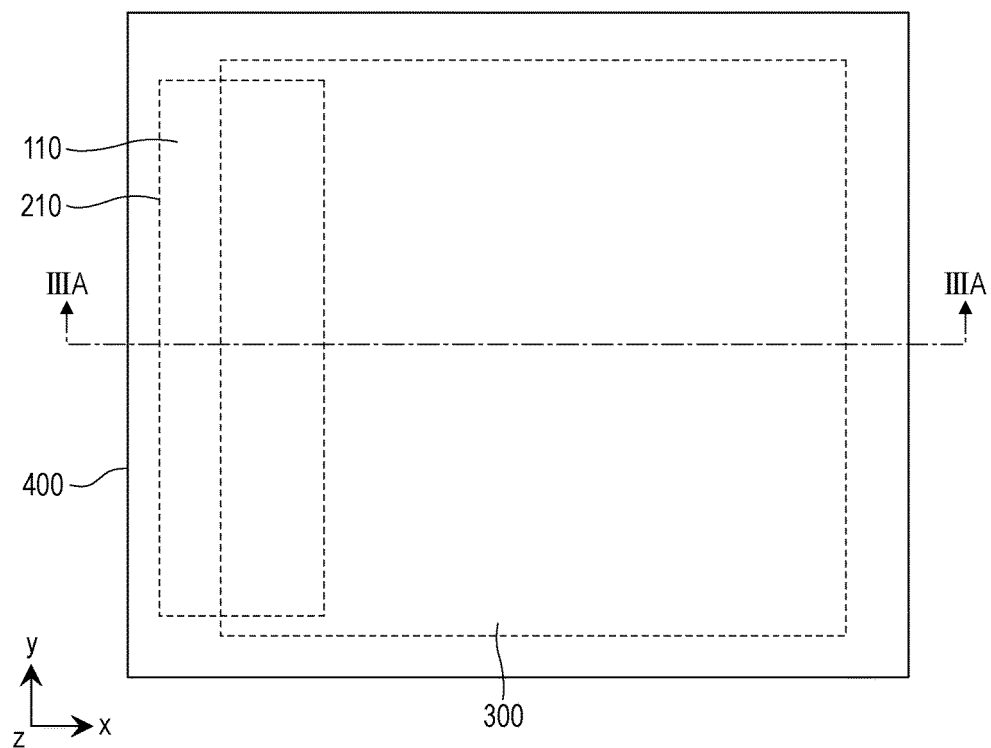

FIGS. 3A and 3B are diagrams schematically showing the configuration of a battery 1200 according to the first embodiment.

FIG. 3A is an x-z diagram (sectional view along line IIIA-IIIA) schematically showing the configuration of the battery 1200 according to the first embodiment.

FIG. 3B is an x-y diagram (perspective top view) schematically showing the configuration of the battery 1200 according to the first embodiment.

In the first embodiment, the first holding member 210 may be arranged between the side surface of the power generating element 300 and the outer case 400, as in the battery 1200 shown in FIGS. 3A and 3B.

According to the above-described configuration, for example, in the case where the battery is arranged at a position at which the battery easily receives an impact from the side surface of the power generating element 300, the first holding member 210 can be more easily damaged at the instant when the outer case 400 is damaged as a result of an impact on the battery. Consequently, the first sealant 110 can be more reliably released. As a result, the power generating element 300 can be covered with the first sealant 110 released and, thereby, further contact between the power generating element 300 and moisture can be prevented. Therefore, further generation of hydrogen sulfide can be more reliably suppressed.

Further, according to the above-described configuration, in the case where an end portion of a layer, which contains the sulfur-based material, (for example, a sulfide solid electrolyte layer) of the power generating element 300 is exposed, the first sealant 110 can be arranged close to the end portion (that is, in a portion from which hydrogen sulfide may be generated). Consequently, the portion, from which hydrogen sulfide may be generated, of the power generating element 300 can be more reliably covered with the first sealant 110 released.

Figure 4A:
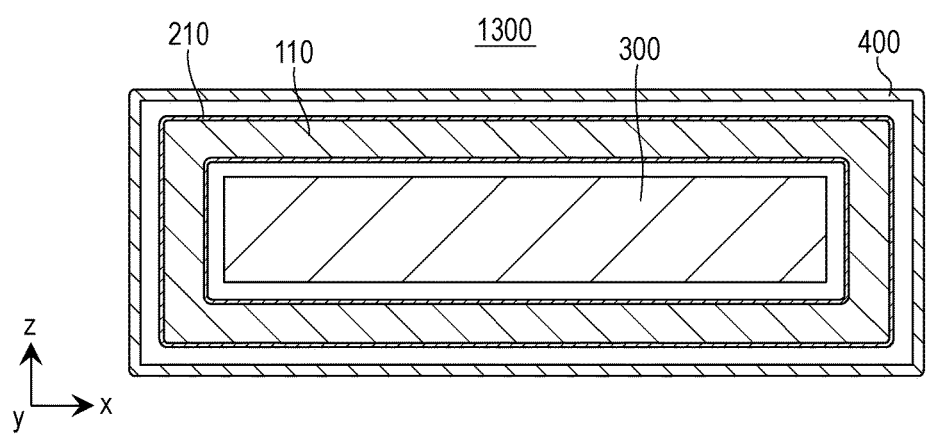
FIGS. 4A and 4B are diagrams schematically showing the configuration of a battery according to the first embodiment.
Figure 4B:
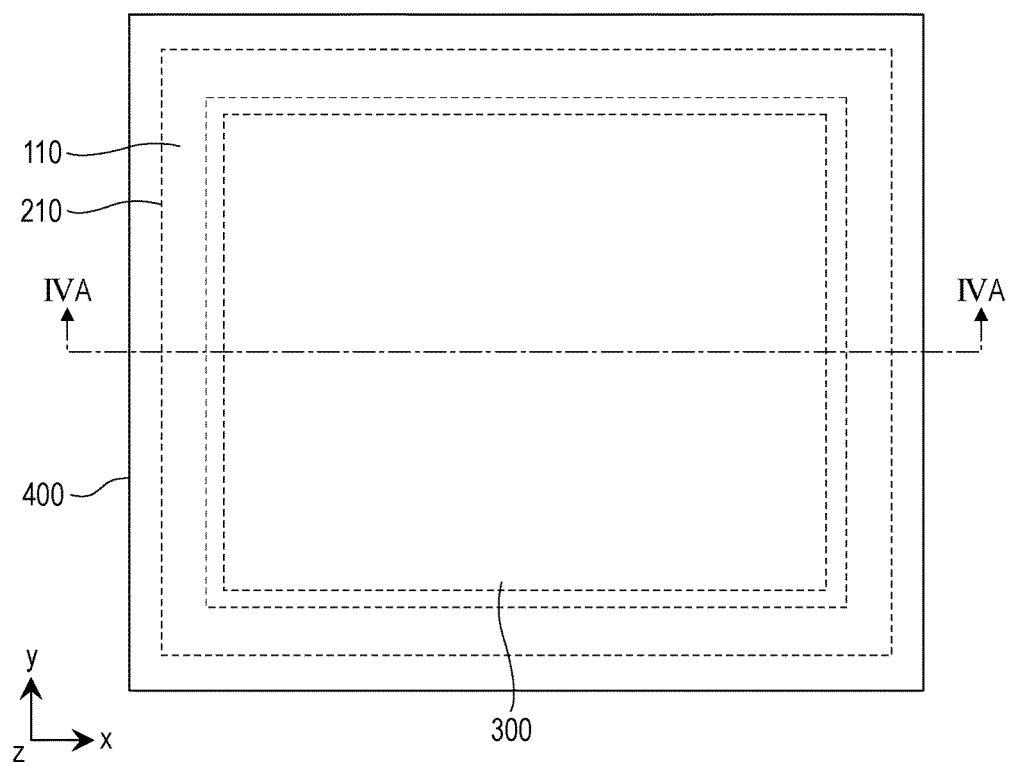

FIGS. 4A and 4B are diagrams schematically showing the configuration of a battery 1300 according to the first embodiment.

FIG. 4A is an x-z diagram (sectional view along line IVA-IVA) schematically showing the configuration of the battery 1300 according to the first embodiment.

FIG. 4B is an x-y diagram (perspective top view) schematically showing the configuration of the battery 1300 according to the first embodiment.

In the first embodiment, the first holding member 210 may be arranged with covering (e.g., so as to cover) the circumference (for example, all the upper surface, the lower surface, and the side surfaces) of the power generating element 300, as in the battery 1300 shown in FIGS. 4A and 4B.

According to the above-described configuration, for example, in the case where the battery receives an impact from any direction, the first holding member 210 can be more easily damaged at the instant when the outer case 400 is damaged. Consequently, the first sealant 110 can be more reliably released, and, thereby, the power generating element 300 can be covered with the first sealant 110 released. As a result, further contact between the power generating element 300 and moisture can be prevented. Therefore, further generation of hydrogen sulfide can be more reliably suppressed.

In the first embodiment, the first sealant 110 may be a fluid sealant (for example, a liquid sealant or a gel sealant).

According to the above-described configuration, a battery having higher reliability can be realized. That is, for example, in the case where the outer case 400 is damaged by an external impact or the like and, in addition, the first holding member 210 is damaged, the fluid first sealant 110 can flow out through damaged portions of the first holding member 210. Consequently, the power generating element 300 can be more reliably covered with the first sealant 110 which flows out (thereafter, for example, the first sealant 110 may solidify). As a result, contact between the power generating element 300 and moisture can be further prevented. Therefore, generation of hydrogen sulfide from the power generating element 300 can be further suppressed.

In the first embodiment, the first sealant 110 may contain a material that solidifies as a result of a reaction with oxygen. For example, a drying oil having an iodine value of 130 or more, a phthalic acid resin paint, or a phenolic resin paint may be used as the material that solidifies as a result of a reaction with oxygen. These may be used after being dissolved or dispersed into organic solvents.

In the first embodiment, the first sealant 110 may contain a material that solidifies as a result of a reaction with moisture. For example, a polysilazane, a metal alkoxide, a cyanoacrylate, or a hydrogen-containing organopolysiloxane may be used as the material that solidifies as a result of a reaction with moisture. These may be used after being dissolved or dispersed into organic solvents.

In the first embodiment, the first sealant 110 may contain a material that solidifies as a result of drying. For example, vinyl acetate or a solution in which nitrile rubber is dissolved in an organic solvent may be used as the material that solidifies as a result of drying.

As described above, in the first embodiment, the fluid first sealant 110 may cover the power generating element 300 and, thereafter, may solidify as a result of a reaction with a substance present inside the outer case 400 (for example, the outside air which gets inside the outer case 400 at the instant when the outer case 400 is damaged).

According to the above-described configuration, entry of moisture into the sealant can be further suppressed by the solidified first sealant 110. Consequently, contact between the power generating element 300 and moisture through the sealant can be more reliably suppressed. Therefore, generation of hydrogen sulfide from the power generating element 300 can be further suppressed.

A specific example of the power generating element 300 will be described below.

Figure 5:
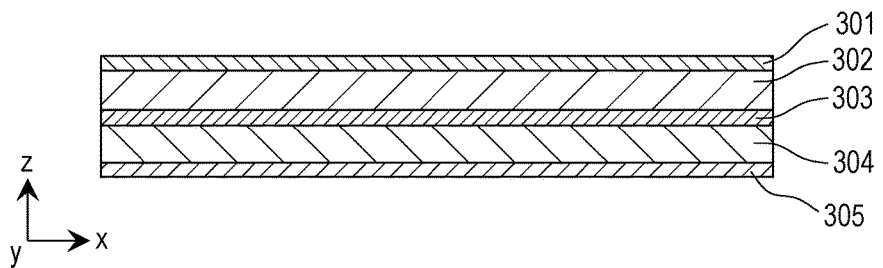
FIG. 5 is a sectional view schematically showing the configuration of an example of a power generating element.

FIG. 5 is a sectional view schematically showing the configuration of an example of the power generating element 300.

The power generating element 300 includes a positive electrode layer 302, a negative electrode layer 304, and an electrolyte layer 303. The electrolyte layer 303 is arranged between the positive electrode layer 302 and the negative electrode layer 304.

At this time, the electrolyte layer 303 may be a solid electrolyte layer containing a solid electrolyte (for example, a sulfide solid electrolyte).

According to the above-described configuration, the battery according to the first embodiment can be formed as a solid-state battery (for example, an all-solid-state lithium secondary battery (storage battery)).

In the first embodiment, the power generating element 300 may further include a positive electrode collector 301 and a negative electrode collector 305.

The positive electrode collector 301 is arranged so as to be in contact with the positive electrode layer 302.

Part of the positive electrode collector 301 serving as a positive electrode terminal may extend (be exposed) outside the outer case 400.

The negative electrode collector 305 is arranged so as to be in contact with the negative electrode layer 304.

Part of the negative electrode collector 305 serving as a negative electrode terminal may extend (be exposed) outside the outer case 400.

As described above, in the first embodiment, the power generating element 300 may be a power generating base element (single-battery cell), as shown in FIG. 5.

A porous or pore-free sheet, film, or the like, which is formed of a metal material, e.g., aluminum, stainless steel, titanium, or an alloy thereof, may be used as the positive electrode collector 301. Aluminum or an alloy thereof is inexpensive and is easily made into a thin film. The sheet or film may be metal foil, a mesh, or the like. The thickness of the positive electrode collector 301 may be 1 to 30 µm. In the case where the thickness of the positive electrode collector 301 is less than 1 µm, the mechanical strength is insufficient, and cracking or breaking easily occurs. In the case where the thickness of the positive electrode collector 301 is more than 30 µm, the energy density of the battery may decrease.

The positive electrode layer 302 is a layer containing a positive electrode active material. The positive electrode layer 302 may be a positive electrode mixture layer containing a positive electrode active material and a sulfide solid electrolyte material (=an example of sulfur-based materials).

For example, a lithium-containing transition metal oxide, a transition metal fluoride, a polyanion or fluorinated polyanion material, a transition metal sulfide, a transition metal oxyfluoride, a transition metal oxysulfide, a transition metal oxynitride, or the like may be used as the positive electrode active material. In particular, in the case where the lithium-containing transition metal oxide is used as positive electrode active material particles, the production cost can be reduced, and the average discharge voltage can increase. It is particularly preferable to use Li(NiCoAl)O$_2$ as the lithium-containing transition metal oxide. In the case where Li(NiCoAl)O$_2$ is used, the energy density of the battery can further increase.

The thickness of the positive electrode layer 302 may be 10 to 500 µm. In the case where the thickness of the positive electrode layer 302 is less than 10 µm, it may be difficult to ensure sufficient energy density of the battery. In the case where the thickness of the positive electrode layer 302 is more than 500 µm, an operation at a high output may be difficult.

The electrolyte layer 303 is, for example, a solid electrolyte layer containing a solid electrolyte (for example, a sulfide solid electrolyte). The solid electrolyte layer may be, for example, a sulfide solid electrolyte layer containing a sulfide solid electrolyte material which is a sulfur-based material.

As the sulfide solid electrolyte material, for example, $Li_2S-P_2S_5$, $Li_2S-SiS_2$, $Li_2S-B_2S_3$, $Li_2S-GeS_2$, $Li_{3.25}Ge_{0.25}P_{0.75}S_4$, or $Li_{10}GeP_2S_{12}$ is used. Also, LiX (X: F, Cl, Br, or I), $Li_2O$, $MO_z$, $Li_yMO_z$ (M: any one of P, Si, Ge, B, Al, Ga, In, Fe, and Zn) (y, z: natural number), or the like may be added to these. $Li_2S-P_2S_5$ has a high ionic conductivity and is not easily reduced at a low potential. Consequently, a battery is easily produced by using $Li_2S-P_2S_5$.

The thickness of the sulfide solid electrolyte layer may be 1 to 100 µm. In the case where the thickness of the sulfide solid electrolyte layer is less than 1 µm, the possibility of occurrence of a short circuit between the positive electrode layer 302 and the negative electrode layer 304 may increase. In the case where the thickness of the sulfide solid electrolyte layer is more than 100 µm, an operation at a high output may be difficult.

The negative electrode layer 304 is a layer containing a negative electrode active material. The negative electrode layer 304 may be, for example, a negative electrode mixture layer containing a negative electrode active material and a sulfide solid electrolyte material (=an example of sulfur-based materials).

The negative electrode active material may be, for example, a material that occludes and releases metal ions. The negative electrode active material may be, for example, a material that occludes and releases lithium ions. For example, a lithium metal, a metal that undergoes an alloying reaction with lithium or an alloy, carbon, a transition metal oxide, a transition metal sulfide, or the like may be used as the negative electrode active material. As the carbon, for example, graphite or non-graphitic carbon, e.g., hard carbon or coke, may be used. As the transition metal oxide, for example, CuO, NiO, or the like may be used. As the transition metal sulfide, for example, copper sulfide represented by CuS may be used. As the metal that undergoes an alloying reaction with lithium or an alloy, for example, an alloy of lithium and a silicon compound, tin compound, or aluminum compound may be used. In the case where the carbon is used, the production cost can be reduced, and the average discharge voltage can be increased.

The thickness of the negative electrode layer 304 may be 10 to 500 µm. In the case where the thickness of the negative electrode layer 304 is less than 10 µm, it may be difficult to secure sufficient energy density of the battery. In the case where the thickness of the negative electrode layer 304 is more than 500 µm, an operation at a high output may be difficult.

A porous or pore-free sheet, film, or the like, which is formed of a metal material, e.g., stainless steel, nickel, copper, or an alloy thereof, may be used as the negative electrode collector 305. Copper or an alloy thereof is inexpensive and is easily made into a thin film. The sheet or film may be metal foil, a mesh, or the like. The thickness of the negative electrode collector 305 may be 1 to 30 µm. In the case where the thickness of the negative electrode collector 305 is less than 1 µm, the mechanical strength thereof is insufficient, and cracking or breaking easily occurs. In the case where the thickness of the negative electrode collector 305 is more than 30 µm, the energy density of the battery may decrease.

At least one of the positive electrode layer 302, the electrolyte layer 303, and the negative electrode layer 304 may contain an oxide solid electrolyte for the purpose of enhancing the ionic conductivity. As the oxide solid electrolyte, a NASICON solid electrolyte represented by $LiTi_2(PO_4)_3$ or an element-substituted product thereof, a (LaLi)$TiO_3$-based perovskite solid electrolyte, a LISICON solid electrolyte represented by $Li_{14}ZnGe_4O_{16}$, $Li_4SiO_4$, $Li_4GeO_4$, or an element-substituted product thereof, a garnet solid electrolyte represented by $Li_7La_3Zr_2O_{12}$ or an element-substituted product thereof, $Li_3N$ or a H-substituted product thereof, $Li_3PO_4$ or a N-substituted product thereof, or the like may be used.

At least one of the positive electrode layer 302, the electrolyte layer 303, and the negative electrode layer 304 may contain an organic polymer solid electrolyte for the purpose of enhancing the ionic conductivity. For example, a compound of a high-molecular-weight compound and a lithium salt may be used as the organic polymer solid electrolyte. The high-molecular-weight compound may have an ethylene oxide structure. In the case where the ethylene oxide structure is employed, a large amount of lithium salt can be contained, and the ionic conductivity can be further enhanced. As the lithium salt, $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, $LiC(SO_2CF_3)_3$, or the like may be used. A lithium salt selected from these may be used alone as the lithium salt. Alternatively, a mixture of at least two lithium salts selected from these may be used as the lithium salt.

At least one of the positive electrode layer 302, the electrolyte layer 303, and the negative electrode layer 304 may contain a nonaqueous electrolytic solution, a gel electrolyte, or an ionic liquid for the purpose of facilitating giving and receiving of lithium ions and enhancing the output characteristics of the battery. The nonaqueous electrolytic solution contains a nonaqueous solvent and a lithium salt dissolved in the nonaqueous solvent. A cyclic carbonic acid ester solvent, a chain carbonic acid ester solvent, a cyclic ether solvent, a chain ether solvent, a cyclic ester solvent, a chain ester solvent, a fluorine solvent, or the like may be used as the nonaqueous solvent. Examples of cyclic carbonic acid ester solvents include ethylene carbonate, propylene carbonate, and butylene carbonate. Examples of chain carbonic acid ester solvents include dimethyl carbonate, ethyl methyl carbonate, and diethyl carbonate. Examples of cyclic ether solvents include tetrahydrofuran, 1,4-dioxane, and 1,3-dioxolane. Examples of chain ether solvents include 1,2-dimethoxyethane and 1,2-diethoxyethane. Examples of cyclic ester solvents include γ-butyrolactone. Examples of chain ester solvents include methyl acetate. Examples of fluorine solvents include fluoroethylene carbonate, fluoropropionic acid methyl, fluorobenzene, fluoroethyl methyl carbonate, and fluorodimethylene carbonate. A nonaqueous solvent selected from these may be used alone as the nonaqueous solvent. Alternatively, at least two nonaqueous solvents selected from these may be used in combination as the nonaqueous solvent. The nonaqueous electrolytic solution may contain at least one fluorine solvent selected from the group consisting of fluoroethylene carbonate, fluoropropionic acid methyl, fluorobenzene, fluoroethyl methyl carbonate, and fluorodimethylene carbonate. As the lithium salt, $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, $LiC(SO_2CF_3)_3$, or the like may be used. A lithium salt selected from these may be used alone as the lithium salt. Alternatively, a mixture of at least two lithium salts selected from these may be used as the lithium salt. The concentration of the lithium salt is within the range of, for example, 0.5 to 2 mol/liter.

A polymer material including a nonaqueous electrolytic solution can be used as the gel electrolyte. As the polymer material, polyethylene oxide, polyacrylonitrile, polyvinylidene fluoride, polymethyl methacrylate, or a polymer having an ethylene oxide bond, or the like may be used.

The cation constituting the ionic liquid may be a cation of any one of aliphatic chain quaternary salts, e.g., tetraalkylammonium and tetraalkylsulfonium, aliphatic cyclic ammoniums, e.g., pyrrolidinium salts, morpholinium salts, imidazolinium salts, tetrahydropyrimidinium salts, piperazinium salts, and piperidinium salts, and nitrogen-containing heterocyclic aromatics, e.g., pyridinium salts and imidazolium salts. The anion constituting the ionic liquid may be $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, or $C(SO_2CF_3)_3^-$. The ionic liquid may contain a lithium salt.

At least one of the positive electrode layer 302, the electrolyte layer 303, and the negative electrode layer 304 may contain a binder for the purpose of enhancing close adhesion between particles. The binder is used for the purpose of enhancing the binding property of the materials constituting the electrode. Examples of the binder include polyvinylidene fluoride, polytetrafluoroethylene, polyethylene, polypropylene, aramid resin, polyamide, polyimide, polyamide imide, polyacrylonitrile, polyacrylic acid, polyacrylic acid methyl ester, polyacrylic acid ethyl ester, polyacrylic acid hexyl ester, polymethacrylic acid, polymethacrylic acid methyl ester, polymethacrylic acid ethyl ester, polymethacrylic acid hexyl ester, polyvinyl acetate, polyvinyl pyrrolidone, polyether, polyether sulfone, hexafluoropolypropylene, styrene butadiene rubber, and carboxymethyl cellulose. As the binder, a copolymer of at least two materials selected from tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene may be used. At least two selected from these may be mixed and be used as the binder.

At least one of the positive electrode layer 302 and the negative electrode layer 304 may contain a conduction promoter for the purpose of enhancing the electrical conductivity. As the conduction promoter, for example, graphite, e.g., natural graphite or artificial graphite, carbon black, e.g., acetylene black or ketjen black, a conductive fiber, e.g., a carbon fiber or a metal fiber, a metal powder of carbon fluoride or aluminum, a conductive whisker of zinc oxide or potassium titanate, a conductive metal oxide, e.g., titanium oxide, or a conductive high-molecular-weight compound, e.g., polyaniline, polypyrrole, or polythiophene, may be used. In the case where the carbon conductive promoter is used, the cost can be reduced.

Figure 6:
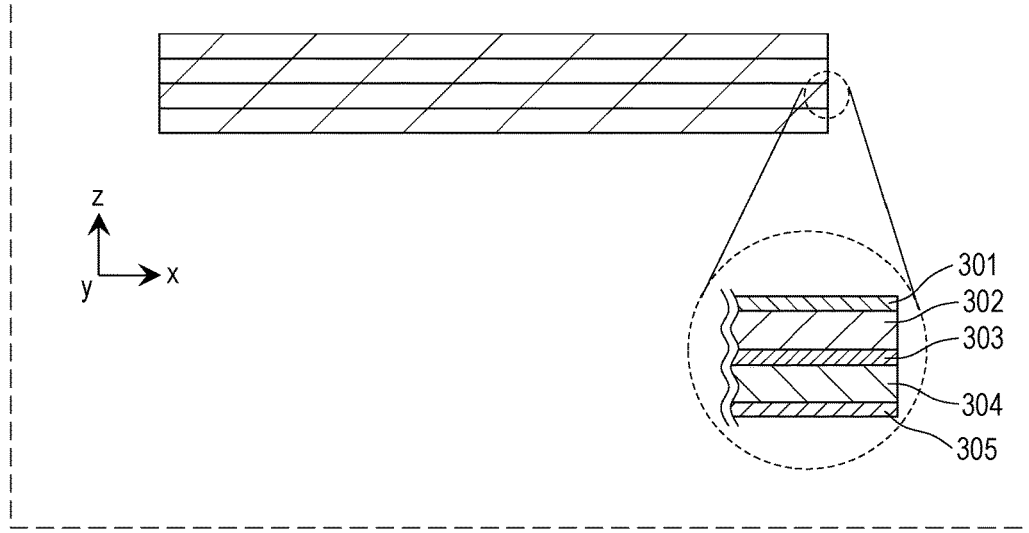
FIG. 6 is a sectional view schematically showing the configuration of another example of the power generating element.

FIG. 6 is a sectional view schematically showing the configuration of another example of the power generating element 300.

The power generating element 300 shown in FIG. 6 is produced by stacking four power generating base elements.

As described above, in the first embodiment, the power generating element 300 may be produced by stacking a plurality of power generating base elements, as shown in FIG. 6.

The plurality of power generating base elements may be connected to each other in series, for example. In the case where the plurality of power generating base elements is connected to each other in series, the voltage of the battery can increase. Alternatively, the plurality of power generating base elements may be connected parallel to each other, for example. In the case where the plurality of power generating base elements is connected in parallel, the capacity of the battery can increase. The number of power generating base elements connected and the connection method may be appropriately selected in accordance with the use of the battery.

The power generating element 300 may be produced by bipolar-stacking the power generating base elements in series. The term "bipolar stacking" refers to connection of the positive electrode layer and an adjacent negative electrode layer of the power generating base element by a bipolar collector having functions of both the positive electrode collector and the negative electrode collector. In the case where the bipolar collector is used, the energy density of the battery can be enhanced.

A commonly known battery case material may be used as the material for forming the outer case 400. The outer case 400 may be a battery case having the shape of a rectangle, a cylinder, a coin, a laminate, or the like.

The outer case 400 may hermetically enclose the first sealant 110, the first holding member 210, and the power generating element 300.

At this time, a resin or the like may seal the space between the outer case 400 and the extension portions of the positive electrode terminal and the negative electrode terminal.

Second Embodiment

A second embodiment will be described below. The explanations duplicated with Embodiment 1 are appropriately omitted.

Figure 7A:
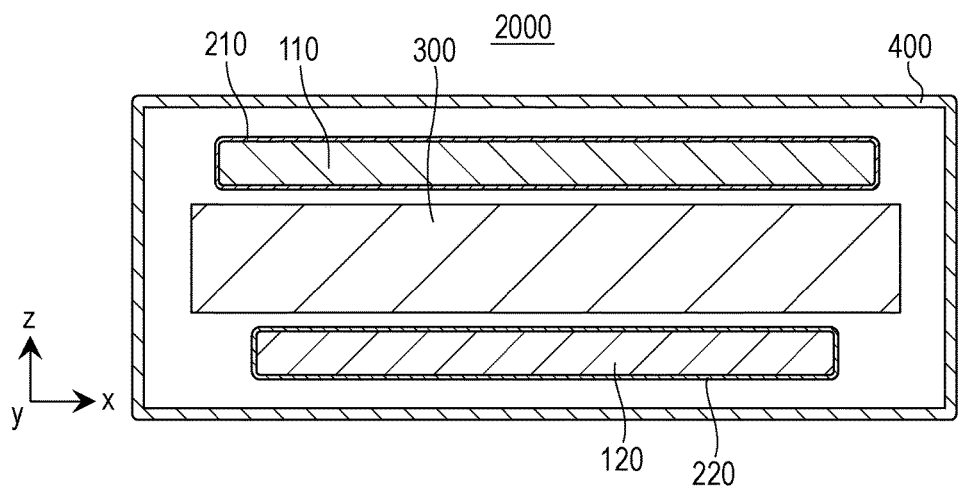
FIGS. 7A and 7B are diagrams schematically showing the configuration of a battery according to a second embodiment.
Figure 7B:
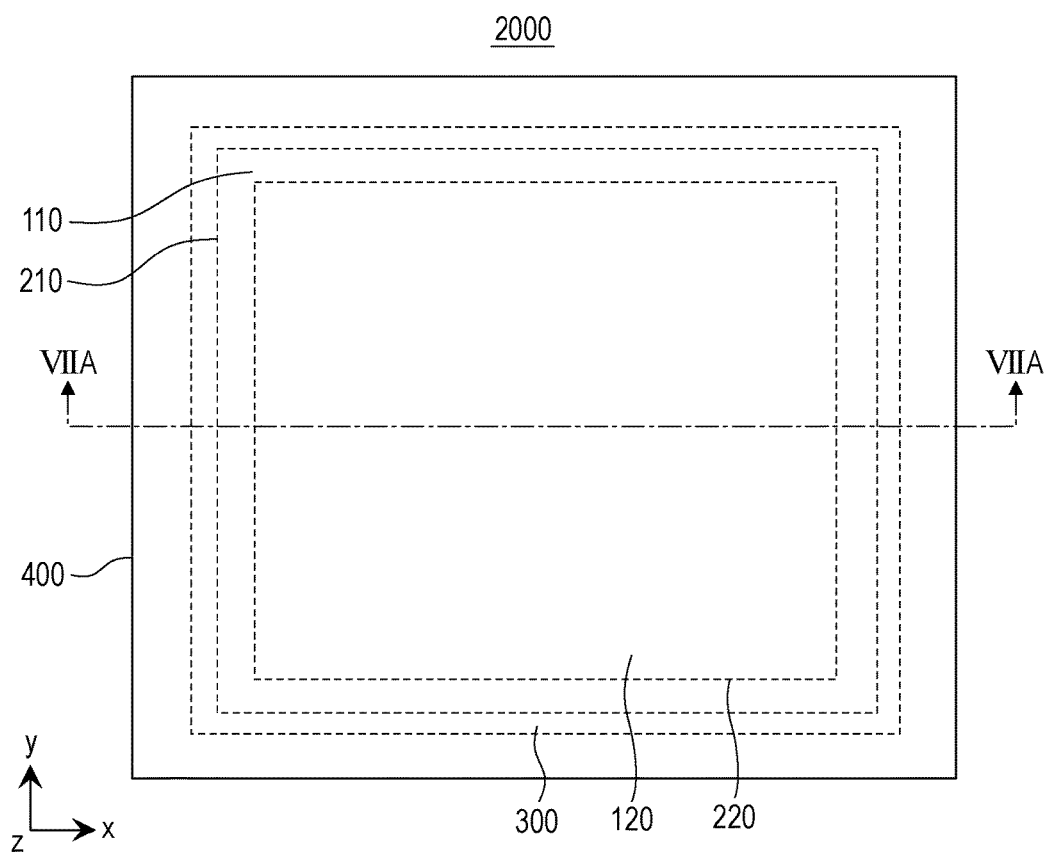

FIGS. 7A and 7B are diagrams schematically showing the configuration of a battery 2000 according to the second embodiment.

FIG. 7A is an x-z diagram (sectional view along line VIIA-VIIA) schematically showing the configuration of the battery 2000 according to the second embodiment.

FIG. 7B is an x-y diagram (perspective top view) schematically showing the configuration of the battery 2000 according to the second embodiment.

The battery 2000 according to the second embodiment further has the following configuration in addition to the configuration of the battery according to the first embodiment.

That is, the battery 2000 according to the second embodiment further includes a second sealant 120 and a second holding member 220.

The second holding member 220 holds the second sealant 120.

The second sealant 120 and the second holding member 220 are enclosed in the outer case 400 together with the power generating element 300.

The second holding member 220 holds the second sealant 120 by enclosing the second sealant 120 while (i.e., in a state in which) the second sealant 120 is not in contact with the power generating element 300.

According to the above-described configuration, a battery having higher reliability can be realized. That is, in the case where the outer case 400 is damaged by an external impact or the like and, in addition, the first holding member 210 and the second holding member 220 are damaged (for example, crack, split, or the like), the first sealant 110 can be released from damaged portions of the first holding member 210 and, in addition, the second sealant 120 can be released from damaged portions of the second holding member 220. Consequently, the power generating element 300 can be covered with the first sealant 110 released and the second sealant 120 released. That is, the two sealants are included and, thereby, the sealants more easily flow out compared with the case where one sealant is included when the outer case 400 is damaged. As a result, contact between the power generating element 300 and moisture can be further prevented. Therefore, generation of hydrogen sulfide from the power generating element 300 can be further suppressed.

According to the above-described configuration, in the case where the battery is free from irregularities (for example, in the case where the outer case 400 is not damaged and there is no probability of generation of hydrogen sulfide), the second holding member 220 can maintain the state in which the second sealant 120 and the power generating element 300 are isolated from each other. Consequently, in the case where the battery is free from irregularities, direct contact between the power generating element 300 and the second sealant 120 can be prevented. As a result, an increase in the internal resistance of the power generating element 300 can be suppressed.

The material, which may be used for forming the first holding member 210, may be used as the material for forming the second holding member 220.

The material for forming the first holding member 210 and the material for forming the second holding member 220 may be the same material or be materials different from each other.

For example, the second holding member 220 may be formed so as to be broken at the instant when the outer case 400 is damaged by an external impact or the like (for example, in the shape of a thin film).

In the second embodiment, the power generating element 300 may contain a sulfur-based material.

In this regard, the first holding member 210 and the second holding member 220 may be corroded by hydrogen sulfide generated as a result of the sulfur-based material contained in the power generating element 300 (for example, as a result of the reaction between the sulfur-based material contained in the power generating element 300 and moisture which gets inside the outer case 400 in the case where the outer case 400 is damaged).

That is, a material (for example, a metal) that forms corrosion holes as a result of the reaction with hydrogen sulfide may be used as the material for forming the first holding member 210 and the second holding member 220.

According to the above-described configuration, the first sealant 110 and the second sealant 120 can be released from corrosion holes formed by hydrogen sulfide. Consequently, for example, even in the case where the first holding member 210 and the second holding member 220 are not sufficiently broken at the instant when the outer case 400 is damaged, the first sealant 110 can be released from corrosion holes of the first holding member 210 and the second sealant 120 can be released from corrosion holes of the second holding member 220 in accordance with generation of hydrogen sulfide. As a result, the power generating element 300 can be covered with the first sealant 110 released and the second sealant 120 released and, thereby, further contact between the power generating element 300 and moisture can be prevented. Therefore, further generation of hydrogen sulfide can be more reliably suppressed.

A metal (for example, copper or silver) that forms corrosion holes as a result of the reaction with hydrogen sulfide may be used as the material for forming the first holding member 210 and the second holding member 220.

In the second embodiment, the first holding member 210 and the second holding member 220 may contain copper.

According to the above-described configuration, the properties of being corroded by hydrogen sulfide of the first holding member 210 and the second holding member 220 can be further enhanced while the production cost is reduced.

The second holding member 220 may be fixed to the outer case 400.

Alternatively, the second holding member 220 may be fixed to the power generating element 300.

A material having electrical conductivity may be used as the material for forming the second holding member 220. At this time, the battery 2000 according to the second embodiment may further include a partition wall (for example, a partition wall having an electron insulating property) or a gap between the second holding member 220 and the power generating element 300. Consequently, direct contact between the second holding member 220 and the power generating element 300 can be prevented.

In the second embodiment, the first holding member 210 may be arranged between a first principal surface (for example, an upper surface) of the power generating element 300 and the outer case 400, as shown in FIGS. 7A and 7B. Further, the second holding member 220 may be arranged between a second principal surface (for example, a lower surface) of the power generating element 300 and the outer case 400, as shown in FIGS. 7A and 7B.

According to the above-described configuration, for example, in the case where the battery is arranged at a position at which the battery easily receives an impact from the direction perpendicular to the principal surface of the power generating element 300, at least one of the first holding member 210 and the second holding member 220 can be more easily damaged at the instant when the outer case 400 is damaged as a result of an impact on the battery. Consequently, at least one of the first sealant 110 and the second sealant 120 can be more reliably released. As a result, the power generating element 300 can be covered with the first sealant 110 released or the second sealant 120 released and, thereby, further contact between the power generating element 300 and moisture can be prevented. Therefore, further generation of hydrogen sulfide can be more reliably suppressed.

The second holding member 220 may have a size that covers the entire principal surface of the power generating element 300 or a size that covers only part of the principal surface of the power generating element 300. As the area occupied by the second holding member 220 increases, the second sealant 120 can more reliably cover the power generating element 300 in the case where the second holding member 220 is damaged. Consequently, the reliability of the battery can be enhanced. On the other hand, as the area occupied by the second holding member 220 increases, the energy density of the battery decreases. The area and the thickness of the second holding member 220 are appropriately designed in consideration of the reliability and the energy density of the battery.

The first sealant 110 released from the first holding member 210 and the second sealant 120 released from the second holding member 220 may cover the entire power generating element 300. Consequently, contact between the entire power generating element 300 and moisture can be prevented. Therefore, generation of hydrogen sulfide from the power generating element 300 can be further suppressed.

Alternatively, the first sealant 110 released from the first holding member 210 may cover part (a first portion that may generate hydrogen sulfide as a result of contact with moisture) of the power generating element 300. At this time, the second sealant 120 released from the second holding member 220 may cover another part (a second portion that may generate hydrogen sulfide as a result of contact with moisture) of the power generating element 300. Consequently, contact between the first portion of the power generating element 300 and moisture and between the second portion and moisture can be prevented by a small amount of first sealant 110 held in the small first holding member 210 and a small amount of second sealant 120 held in the small second holding member 220. Therefore, generation of hydrogen sulfide from the first portion and the second portion of the power generating element 300 can be suppressed without decreasing the energy density of the battery to a great extent.

Figure 8A:
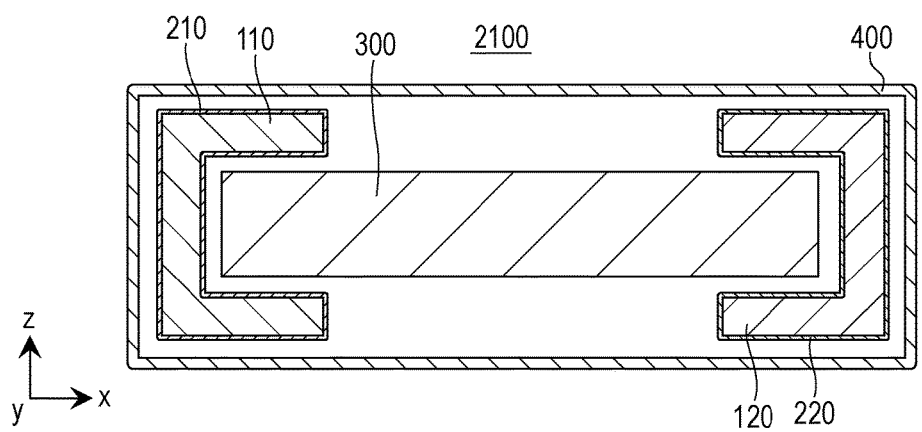
FIGS. 8A and 8B are diagrams schematically showing the configuration of a battery according to the second embodiment.
Figure 8B:
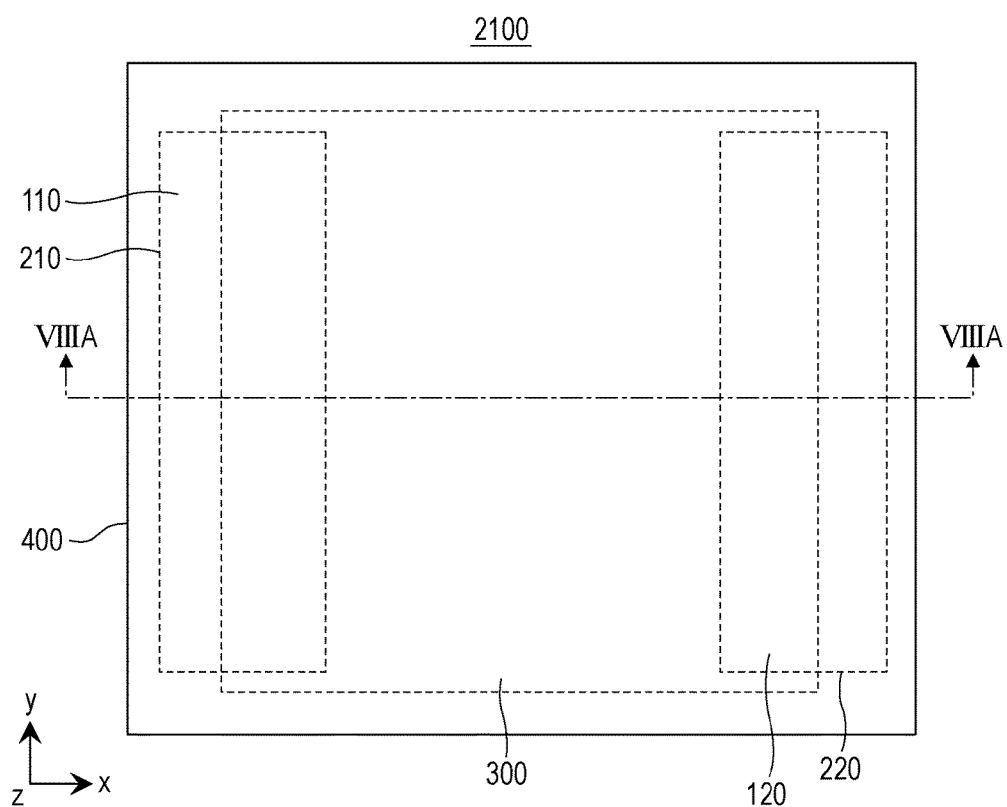

FIGS. 8A and 8B are diagrams schematically showing the configuration of a battery 2100 according to the second embodiment.

FIG. 8A is an x-z diagram (sectional view along line VIIIA-VIIIA) schematically showing the configuration of the battery 2100 according to the second embodiment.

FIG. 8B is an x-y diagram (perspective top view) schematically showing the configuration of the battery 2100 according to the second embodiment.

In the second embodiment, the first holding member 210 may be arranged between a first side surface of the power generating element 300 and the outer case 400, as in the battery 2100 shown in FIGS. 8A and 8B.

Further, the second holding member 220 may be arranged between a second side surface of the power generating element 300 and the outer case 400, as shown in FIGS. 8A and 8B.

According to the above-described configuration, for example, in the case where the battery is arranged at a position at which the battery easily receives an impact from the side surface of the power generating element 300, at least one of the first holding member 210 and the second holding member 220 can be more easily damaged at the instant when the outer case 400 is damaged as a result of an impact on the battery. Consequently, at least one of the first sealant 110 and the second sealant 120 can be more reliably released. As a result, the power generating element 300 can be covered with the first sealant 110 released or the second sealant 120 released and, thereby, further contact between the power generating element 300 and moisture can be prevented. Therefore, further generation of hydrogen sulfide can be more reliably suppressed.

Further, according to the above-described configuration, in the case where an end portion of a layer, which contains the sulfur-based material, (for example, a sulfide solid electrolyte layer) of the power generating element 300 is exposed, the first sealant 110 and the second sealant 120 can be arranged close to the end portion (that is, in a portion from which hydrogen sulfide may be generated). Consequently, the portion, from which hydrogen sulfide may be generated, of the power generating element 300 can be more reliably covered with the first sealant 110 released and the second sealant 120 released.

The material, which may be used for forming the first sealant 110, may be used as the material for forming the second sealant 120.

The material for forming the first sealant 110 and the material for forming the second sealant 120 may be the same material or be materials different from each other.

In the second embodiment, the first sealant 110 and the second sealant 120 may be fluid sealants (for example, liquid sealants or gel sealants).

According to the above-described configuration, a battery having higher reliability can be realized. That is, for example, in the case where the outer case 400 is damaged by an external impact or the like and, in addition, the first holding member 210 and the second holding member 220 are damaged, the fluid first sealant 110 can flow out through damaged portions of the first holding member 210 and the fluid second sealant 120 can flow out through damaged portions of the second holding member 220. Consequently, the power generating element 300 can be more reliably covered with the first sealant 110 which flows out and the second sealant 120 which flows out (thereafter, for example, the first sealant 110 and the second sealant 120 may solidify). As a result, contact between the power generating element 300 and moisture can be further prevented. Therefore, generation of hydrogen sulfide from the power generating element 300 can be further suppressed.

In the second embodiment, the fluid second sealant 120 may cover the power generating element 300 and, thereafter, may solidify as a result of a reaction with a substance present inside the outer case 400 (for example, the outside air which gets inside the outer case 400 at the instant when the outer case 400 is damaged).

According to the above-described configuration, entry of moisture into the sealant can be further suppressed by the solidified first sealant 110 and the second sealant 120. Consequently, contact between the power generating element 300 and moisture through the sealant can be more reliably suppressed. Therefore, generation of hydrogen sulfide from the power generating element 300 can be further suppressed.

In the second embodiment, the first sealant 110 and the second sealant 120 may react and solidify as a result of coming into contact with each other.

That is, the first sealant 110 and the second sealant 120 may contain the respective materials which do not solidify alone but which react as a result of coming into contact with each other so as to solidify.

According to the above-described configuration, a battery having higher reliability can be realized. That is, for example, in the case where a liquid sealant that solidifies alone is used, solidification of the liquid sealant may start before the liquid sealant wet-spreads around the power generating element 300. Consequently, the power generating element 300 may be insufficiently covered. On the other hand, in the case where the first sealant 110 and the second sealant 120 contain the respective materials which react as a result of coming into contact with each other so as to solidify, each of the fluid sealants can uniformly wet-spreads around the power generating element 300. Consequently, solidification starts only after each of the fluid sealants uniformly wet-spreads around the power generating element 300 and the two sealants come into contact with each other. As a result, the power generating element 300 can be sufficiently covered and generation of hydrogen sulfide can be satisfactorily suppressed.

As the materials which do not solidify alone but which react as a result of coming into contact with each other so as to solidify, a base resin and a curing agent may be used.

As the base resin, a bisphenol A epoxy resin, a bisphenol F epoxy resin, a bisphenol AD epoxy resin, a novolac epoxy resin (phenol-novolac epoxy resin, cresol-novolac epoxy resin), a cyclic aliphatic epoxy resin, a chain aliphatic epoxy resin, a glycidyl amine epoxy resin, a glycidyl ester epoxy resin, or the like may be used. Also, these may be used after being dissolved or dispersed into organic solvents.

As the curing agent, an amine curing agent, e.g., an aliphatic polyamine (diethylene triamine or triethylene tetramine), a modified amine, ketimine, an aromatic polyamine (metaphenylene diamine, diaminodiphenylmethane, or diaminodiphenyl sulfone), an acid anhydride curing agent, e.g., phthalic anhydride, tetrahydrophthalic anhydride, hexahydrophthalic anhydride, methyltetrahydrophthalic anhydride, methylnadic anhydride, pyromellitic anhydride, HET anhydride, or dodecenylsuccinic anhydride, a polyamide curing agent, or the like may be used. Also, these may be used after being dissolved or dispersed into organic solvents.

The batteries according to the first embodiment and the second embodiment may be formed as batteries having various shapes, such as a coin, a cylinder, a rectangle, a sheet, a button, a flat, and a laminate.

The battery according to the present disclosure can be used as, for example, an all-solid-state lithium secondary battery.

What is claimed is:

1. A battery comprising:
    a power generating element including a positive electrode, a negative electrode and an electrolyte arranged between the positive electrode and the negative electrode;
    a first sealant;
    a first holding member enclosing the first sealant therein; and
    an outer case enclosing the power generating element, the first sealant and the first holding member, wherein:
    the first holding member enclosing the first sealant is disposed between an inner wall of the outer case and the power generating element,
    the first sealant, when enclosed in the first holding member, is not in contact with the power generating element,
    at least one of the positive electrode, the negative electrode, and the electrolyte layer contains a solid electrolyte including a sulfur-based material, and
    the first holding member is corroded by hydrogen sulfide generated as a result of a reaction with the sulfur-based material.

2. The battery according to claim 1, wherein the first holding member contains copper.

3. The battery according to claim 1, wherein the first holding member is arranged between a principal surface of the power generating element and the inner wall of the outer case.

4. The battery according to claim 1, wherein the first holding member is arranged between a side surface of the power generating element and the inner wall of the outer case.

5. The battery according to claim 1, wherein the first holding member is arranged so as to cover the circumference of the power generating element.

6. The battery according to claim 1, wherein the first sealant is a fluid sealant.

7. The battery according to claim 6, wherein a material of the first sealant solidifies as a result of a reaction with oxygen.

8. The battery according to claim 6, wherein a material of the first sealant solidifies as a result of a reaction with moisture.

9. The battery according to claim 8,
wherein the material of the first sealant includes at least one selected from the group consisting of a drying oil having an iodine value of 130 or more, a phthalic acid resin paint, and a phenolic resin paint.

10. The battery according to claim 8,
wherein the material of the first sealant includes at least one selected from the group consisting of a polysilazane, a metal alkoxide, a cyanoacrylate, and a hydrogen-containing organopolysiloxane.

11. The battery according to claim 6,
wherein a material of the first sealant solidifies as a result of drying.

12. The battery according to claim 11,
wherein the material of the first sealant includes at least one selected from the group consisting of a vinyl acetate and a solution in which nitrile rubber is dissolved in an organic solvent.

13. The battery according to claim 1, further comprising:
a second sealant; and
a second holding member enclosing the second sealant therein, wherein:
the second sealant and the second holding member are enclosed in the outer case together with the power generating element, and
the second sealant, when enclosed in the second holding member, is not in contact with the power generating element.

14. The battery according to claim 13,
wherein
the first holding member and the second holding member are corroded by hydrogen sulfide generated as a result of a reaction with the sulfur-based material.

15. The battery according to claim 14,
wherein the first holding member and the second holding member contain copper.

16. The battery according to claim 13, wherein:
the first holding member is arranged between a first principal surface of the power generating element and the inner wall of the outer case, and
the second holding member is arranged between a second principal surface of the power generating element and the inner wall of the outer case.

17. The battery according to claim 13, wherein:
the first holding member is arranged between a first side surface of the power generating element and the inner wall of the outer case, and
the second holding member is arranged between a second side surface of the power generating element and the inner wall of the outer case.

18. The battery according to claim 13,
wherein the first sealant and the second sealant are fluid sealants.

19. The battery according to claim 18,
wherein the first sealant and the second sealant react with each other and solidify as a result of coming into contact with each other.

20. The battery according to claim 13,
wherein the outer case hermetically encloses the power generating element, the first sealant, the first holding member, the second sealant and the second holding member.

21. The battery according to claim 13,
wherein the second sealant contains a material that is a fluid when enclosed in the second holding member, and solidifies when released from the second holding member.

22. The battery according to claim 1,
wherein the outer case hermetically encloses the power generating element, the first sealant and the first holding member.

23. The battery according to claim 1,
wherein the first sealant contains a material that is a fluid when enclosed in the first holding member, and solidifies when released from the first holding member.

* * * * *